United States Patent
Chang et al.

(10) Patent No.: US 6,502,196 B1
(45) Date of Patent: Dec. 31, 2002

(54) VOLTAGE CONVERTER FOR APPLYING SUSPENSION VOLTAGE TO A RAM WHEN RESUME SIGNAL IS LOW WHILE SUSPENSION-TO-RAM SIGNAL IS HIGH, AND APPLYING SOURCE VOLTAGE IN A REVERSE CONDITION

(75) Inventors: Nai-Shung Chang, Taipei Hsien (TW); Jang-Lih Hsieh, Taipei Hsien (TW)

(73) Assignee: Via Technologies, Inc., Taipei Hsien (TW)

( * ) Notice: Subject to any disclaimer, the term of this patent is extended or adjusted under 35 U.S.C. 154(b) by 0 days.

(21) Appl. No.: 09/436,590

(22) Filed: Nov. 9, 1999

(30) Foreign Application Priority Data

Jun. 11, 1999 (TW) ........................ 88109771 A

(51) Int. Cl.[7] ................................. G06F 1/26
(52) U.S. Cl. .................... 713/324; 713/323; 365/229; 326/119
(58) Field of Search ................ 713/300, 320, 713/323, 324; 326/119, 122; 327/540, 541, 543, 544; 365/226, 227, 229

(56) References Cited

U.S. PATENT DOCUMENTS

| | | | | |
|---|---|---|---|---|
| 5,375,247 A | * | 12/1994 | Hueser ....................... 365/229 |
| 5,832,281 A | * | 11/1998 | Maeda ....................... 713/300 |
| 6,092,207 A | * | 7/2000 | Kolinski et al. ............ 713/323 |
| 6,115,824 A | * | 9/2000 | Ha .............................. 713/300 |
| 6,230,274 B1 | * | 5/2001 | Stevens et al. ............. 713/320 |
| 6,272,645 B1 | * | 8/2001 | Wang ......................... 713/323 |
| 6,389,556 B1 | * | 5/2002 | Qureshi ..................... 713/320 |

* cited by examiner

*Primary Examiner*—Thomas Lee
*Assistant Examiner*—Thuan Du
(74) *Attorney, Agent, or Firm*—J. C. Patents

(57) ABSTRACT

A voltage converter for supporting a suspension-to-RAM (STR) mode of power management. The voltage converter has a flip-flop, a resume & initialization logic circuit for producing a resume signal, a STR logic circuit for producing a STR signal, a first voltage-conversion unit and a second voltage-conversion unit. An output terminal of the resume & initialization logic circuit is connected to a first input terminal of the flip-flop. An output terminal of the STR logic circuit is connected to a second input terminal of the flip-flop. An output terminal of the flip-flop is connected to the first voltage-conversion unit, and a complementary output terminal of the flip-flop is connected to the second voltage-conversion unit. A suspension voltage or a power voltage is applied to the voltage pin of a system memory depending on the mode of power management.

14 Claims, 4 Drawing Sheets

VOLTAGE CONVERTER FOR APPLYING SUSPENSION VOLTAGE TO A RAM WHEN RESUME SIGNAL IS LOW WHILE SUSPENSION-TO-RAM SIGNAL IS HIGH, AND APPLYING SOURCE VOLTAGE IN A REVERSE CONDITION

CROSS-REFERENCE TO RELATED APPLICATION

This application claims the priority benefit of Taiwan application serial no. 88109771, filed Jun. 11, 1999.

BACKGROUND OF THE INVENTION

1. Field of Invention

The present invention relates to a voltage converter. More particularly, the present invention relates to a voltage converter for a suspension-to-RAM (STR) mode of power management in a computer system.

2. Description of Related Art

Ever since the ATX specification for a personal computer was introduced by Intel Corporation of America, power supply has no longer been a passively switched power provider for a computer system. Thereafter, Intel, Microsoft and Toshiba together introduced the advanced configuration and power interface (ACPI) specification that provides four idle states representing the level of tasks for a computer system. Depending on the amount of tasks for a computer system, energy can be saved by suspending power from some of the devices. In the ACPI specification, according to the amount of tasks from small to large, the suspension idle modes provide 4 states: S1/S2 states, power-on suspend; S3 state, suspending to RAM (STR); S4 state, suspending to disk; and, S5 state, mechanical off. When it is suspended to RAM, all other clock pulses except the real-time clock on the main circuit board are stopped temporarily. Under such circumstances, the CPU and other electric circuit will stop working due to the absence of electrical power.

An apparatus for efficiently providing appropriate level of voltage to the system memory of a computer when the computer enters/recoveries to/from STR mode is currently being actively research.

SUMMARY OF THE INVENTION

Accordingly, the object of the present invention is to provide a voltage converter for a suspension-to-RAM (STR) mode of power management in a computer system. The voltage converter is capable of supplying a correct voltage to a system memory according to the mode of power management.

A second object of the invention is to provide a voltage converter for the STR mode of power management. The voltage converter is capable of changing the voltage applied to the system memory according to whether the computer system is in the STR mode or the normal mode.

A third object of the invention is to provide a voltage converter for the STR mode of power management. The voltage converter is integrated within a single chip such that the converter is able to transmit data to or from a control chipset via a bus.

To achieve these and other advantages and in accordance with the purpose of the invention, as embodied and broadly described herein, the invention provides a voltage converter. The voltage converter comprises a flip-flop, a resume & initialization logic circuit for producing a resume signal, a STR logic circuit for producing a STR signal, a first voltage-conversion unit and a second voltage-conversion unit. An output terminal of the resume & initialization logic circuit is connected to a first input terminal of the flip-flop. An output terminal of the STR logic circuit is connected to a second input terminal of the flip-flop. An output terminal of the flip-flop is connected to the first voltage-conversion unit. When the resume signal is at a low level and the STR signal is at a high level, the system memory voltage $V_{DIMM}$ is changed to a suspension voltage $V_{SUS}$. A complementary output terminal of the flip-flop is connected to the second voltage-conversion unit. When the resume signal is at a high level and the STR signal is at a low level, the system memory voltage $V_{DIMM}$ reverts to a power voltage $V_{CC}$.

The invention also provides a voltage converter control chip capable of implementing a STR mode of power management in a computer system. The voltage converter control chip comprises a bus interface, a controller, a logic control circuit, a first voltage-conversion unit and a second voltage-conversion unit. The bus interface is connected to the control chipset through a bus. The controller has a first and a second output terminal. The controller is connected to the bus interface. The logic control circuit has a first and a second output terminal. The logic control circuit is used as a logic circuit for switching into or out of a STR mode of power management. The first voltage-conversion unit is connected to the logic control circuit and a first output terminal of the controller via a first logic gate. An input terminal of the first voltage-conversion unit is connected to a suspension voltage $V_{SUS}$. An output terminal of the first voltage-conversion unit is connected to a voltage pin $V_{DIMM}$ of the system memory. Similarly, the second voltage-conversion unit is connected to the logic control circuit and a second output terminal of the controller via a second logic gate. An input terminal of the second voltage-conversion unit is connected to a power voltage $V_{CC}$. An output terminal of the second voltage-conversion unit is connected to the voltage pin $V_{DIMM}$ of the system memory. To switch the computer system into the STR mode of power management, the first voltage-conversion unit is turned on while the second voltage-conversion unit is turn off according to the output control signals of the logic control circuit. Hence, the suspension voltage $V_{SUS}$ is output to the system memory pin $V_{DIMM}$, and the STR mode of power management is activated. To switch the computer system back from the STR mode of power management, the first voltage-conversion unit is turned off while the second voltage-conversion unit is turned on according to the output control signals of the logic control circuit. Hence, the source voltage $V_{CC}$ is output to the system memory pin $V_{DIMM}$, and the computer is resumed to power-on state.

The first voltage-conversion unit can be implemented using a P-channel metal-oxide-semiconductor field effect transistor (PMOSFET). The source of the PMOSFET is connected to a suspension voltage $V_{SUS}$ and the drain is connected to the voltage pin $V_{DIMM}$ of the system memory. The second voltage-conversion unit can be implemented using an N-channel metal-oxide-semiconductor field effect transistor (NMOSFET). The source of the NMOSFET is connected to a source voltage $V_{CC}$ and the drain is connected to the voltage pin $V_{DIMM}$ of the system memory.

In short, the voltage converter or the voltage converter control chip that supports the STR mode of power management in a computer comprises simple logic circuits and MOSFET transistors. It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
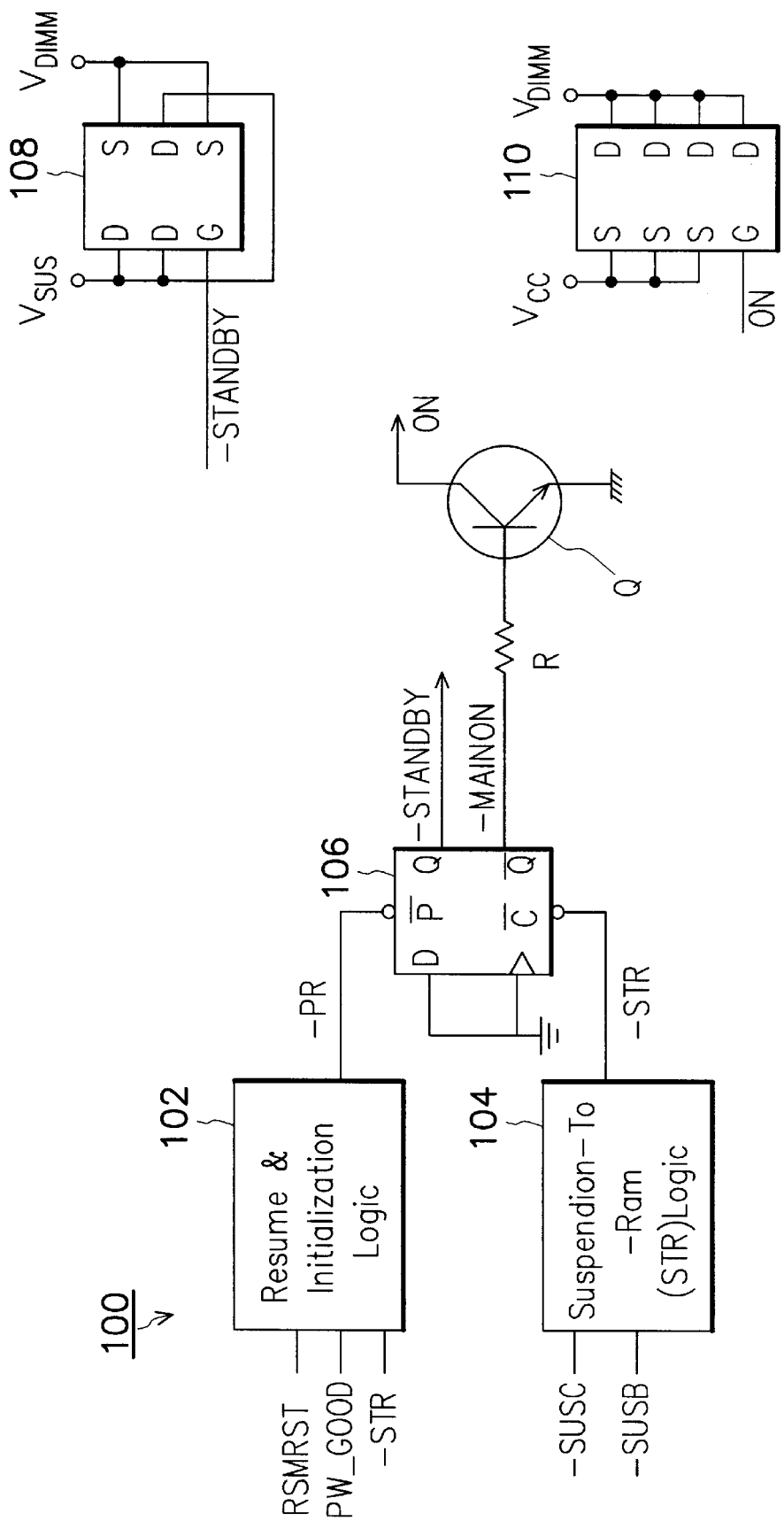
FIG. 1 is a schematic block diagram showing a voltage converter that supports a suspension-to-RAM mode of power management according to one embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic block diagram showing a voltage converter that supports a suspension-to-RAM mode of power management according to one embodiment of this invention. In this embodiment, negative logic is used to operate the circuit and so a '–' is put in front of various signal labels when appropriate. However, negative logic is used for illustrative purpose, only, and should by no means be construed as a limitation of this invention.

As shown in FIG. 1, the voltage converter 100 comprises a flip-flop 106, a resume & initialization logic circuit 102, a suspension-to-RAM (STR) circuit 104, a first DC/DC converter 108 and a second DC/DC converter 110. The flip-flop 106 can be a J-K flip-flop, for example. An output terminal of the resume & initialization logic circuit 102 is connected to the input terminal $\overline{P}$ of the flip-flop 106 for sending a resume signal (–PR) to the flip-flop 106. An output terminal of the STR logic circuit 104 is connected to the input terminal $\overline{C}$ of the flip-flop 106 for sending a STR signal (–STR) to the flip-flop 106. The first DC/DC converter 108 is coupled to the output terminal Q of the flip-flop 106. When the output resume signal –PR of the resume & initialization logic circuit 102 is low and output signal –STR of the STR logic circuit is high, the system memory's voltage $V_{DIMM}$ is changed to a suspension voltage $V_{SUS}$. The second DC/DC converter 110 is coupled to the output terminal $\overline{Q}$ of the flip-flop 106. When the output resume signal –PR of the resume & initialization logic circuit 102 is high and the output signal –STR of the STR logic circuit 104 is low, the system memory's voltage $V_{DIMM}$ reverts to the power voltage $V_{CC}$ of about 3.3V, for example.

Figure 2A:
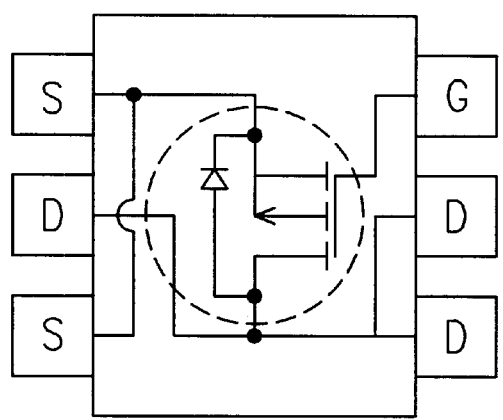
FIG. 2A is a schematic diagram showing the ND632P package and its terminals.

To achieve the purpose of this invention, the first converter 108 can be a P-channel metal-oxide-semiconductor field effect transistor (P-channel MOSFET), for example, a logic level enhancement mode FET (the model type of ND632P can be as an example here). FIG. 2A is a schematic diagram showing the ND632P package and its terminals. In this embodiment, the gate terminal (G) of the PMOSFET is connected to the output terminal Q of the flip-flop 106, the drain terminals (D) are connected to a suspension voltage $V_{SUS}$, and the source terminals (S) are connected to the voltage pin $V_{DIMM}$ of the system memory.

Figure 2B:
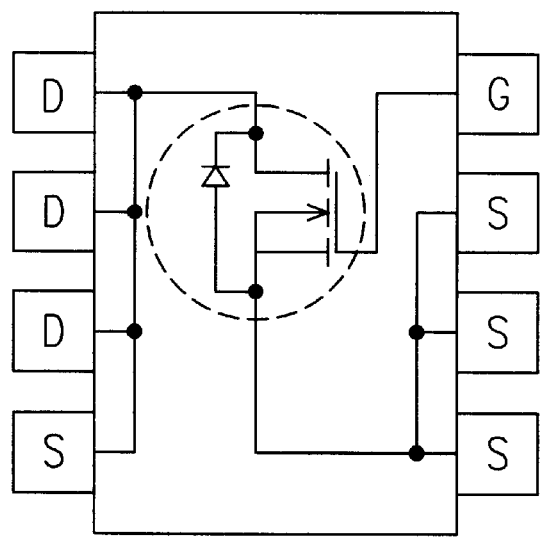
FIG. 2B is a schematic diagram showing the FDS6680 package and its terminals.

The second converter 110 can be an N-channel metal-oxide-semiconductor field effect transistor (N-channel MOSFET), for example, a FET having the model type of FDS6680. FIG. 2B is a schematic diagram showing the FDS6680 package and its terminals. In this embodiment, the gate terminal (G) of the NMOSFET is connected to the complementary output terminal $\overline{Q}$ of the flip-flop 106 via a bipolar transistor Q, the drain terminals (D) are connected to a source voltage $V_{CC}$ and the source terminals (S) are connected to the voltage pin $V_{DIMM}$ of the system memory. The bipolar transistor Q is a means of changing the logic state of the output signal (–MAINON) from the output terminal $\overline{Q}$ so that the second converter 110 can operate accordingly.

Figure 3A:
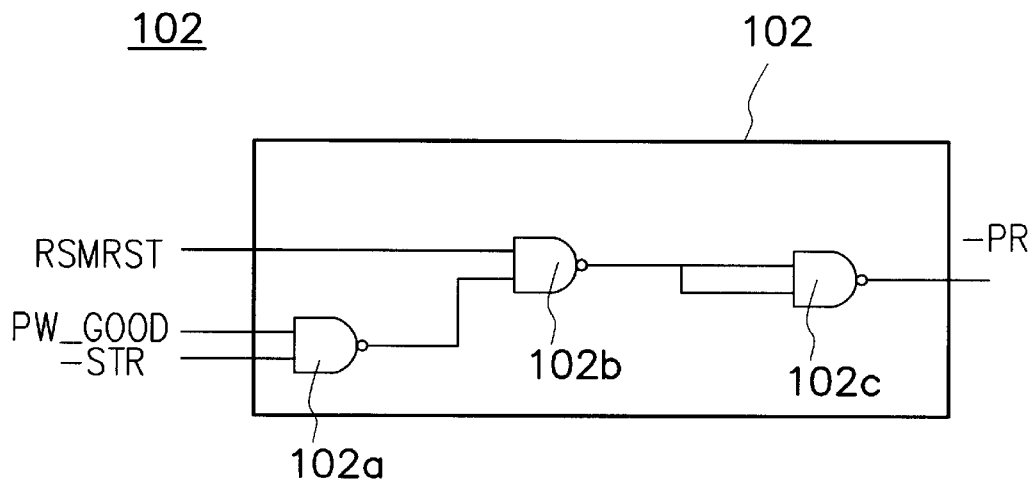
FIG. 3A is an example circuit of the resume & initialization logic circuit shown in FIG. 1.
Figure 3B:
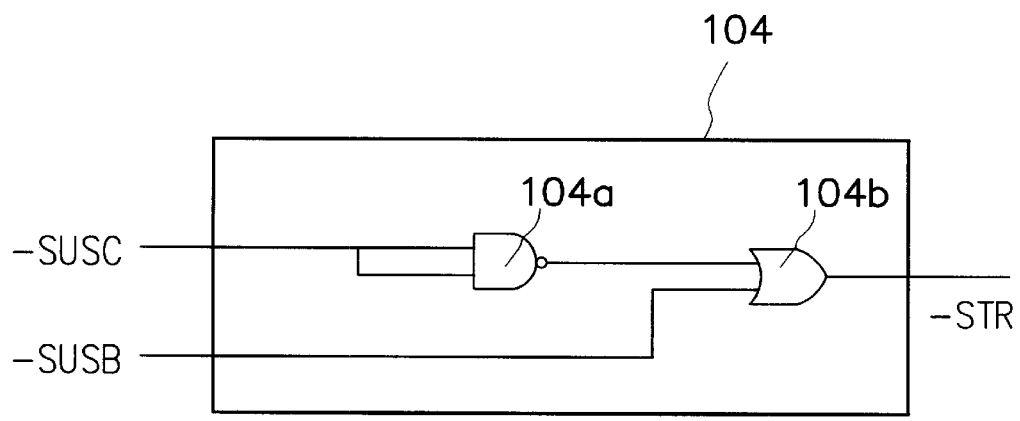
FIG. 3B is an example circuit of the STR logic circuit shown in FIG. 1.

FIG. 3A is an exemplary circuit of the resume & initialization logic circuit 102 shown in FIG. 1. FIG. 3B is an exemplary circuit of the STR logic circuit 104 shown in FIG. 1. As shown in FIGS. 3A and 3B, the resume & initialization logic circuit 102 and the STR logic circuit 104 are built using various logic gates including NAND gates 102a, 102b, 102c and 104a and an OR gate 104b.

According to the circuits in FIGS. 1, 3A and 3B, signals –PR and –STR are input to the input terminals $\overline{P}$ and $\overline{C}$ of the flip-flop 106 which output from the output terminals of the resume & initialization logic circuit 102 and the STR logic circuit 104, respectively. Their logic equations are shown as follows and their truth table is shown in Table 1.

Input terminal of the flip-flop $\overline{P}$=RSMRST+PW_GOOD(–STR);

Input terminal of the flip-flop $\overline{C}$=–STR=suspension-to-RAM signal;

and

Signal –MAINON=output signal from the flip-flop at the complementary output terminal $\overline{Q}$.

TABLE 1

| Pin State | RSMRST | –STR | PW_GOOD | –PR | –C | –MAINON |
|---|---|---|---|---|---|---|
| Initial | 0 | 1 | X | 0 | 1 | 0 |
| Start-up | 1 | 1 | 0 | 1 | 1 | Unchanged |
| Enter STR | 1 | 0 | 1 | 1 | 0 | 1 |
| PW LOSS | 1 | 0 | 0 | 1 | 0 | 1 |
| RESUME | 1 | 1 | 0 | 1 | 1 | Unchanged |
| PW_GOOD | 1 | 1 | 1 | 0 | 1 | 0 |

For example, when the system enters to the STR mode of power management, the power-good signal PW_GOOD is at state of logic '0' and the suspend signal –SUSB is at state of logic '1'. When the suspend signal –SUSC is at logic '0', the STR signal –STR obtained from the circuit in FIG. 3B is a logic '1'. The output signal from the flip-flop 106 turns on the first converter 108 but turns off the second converter 110. In this way, voltage to the system memory is changed from $V_{DIMM}$ to the suspend voltage $V_{SUS}$. Similarly, to switch from the STR mode to the normal mode of power management, the first converter 108 can be turned off while the second converter 110 can be turned on by following the values in the truth table, Table 1. Therefore, the system memory voltage is changed back from $V_{SUS}$ to $V_{DIMM}$ again.

Figure 4:
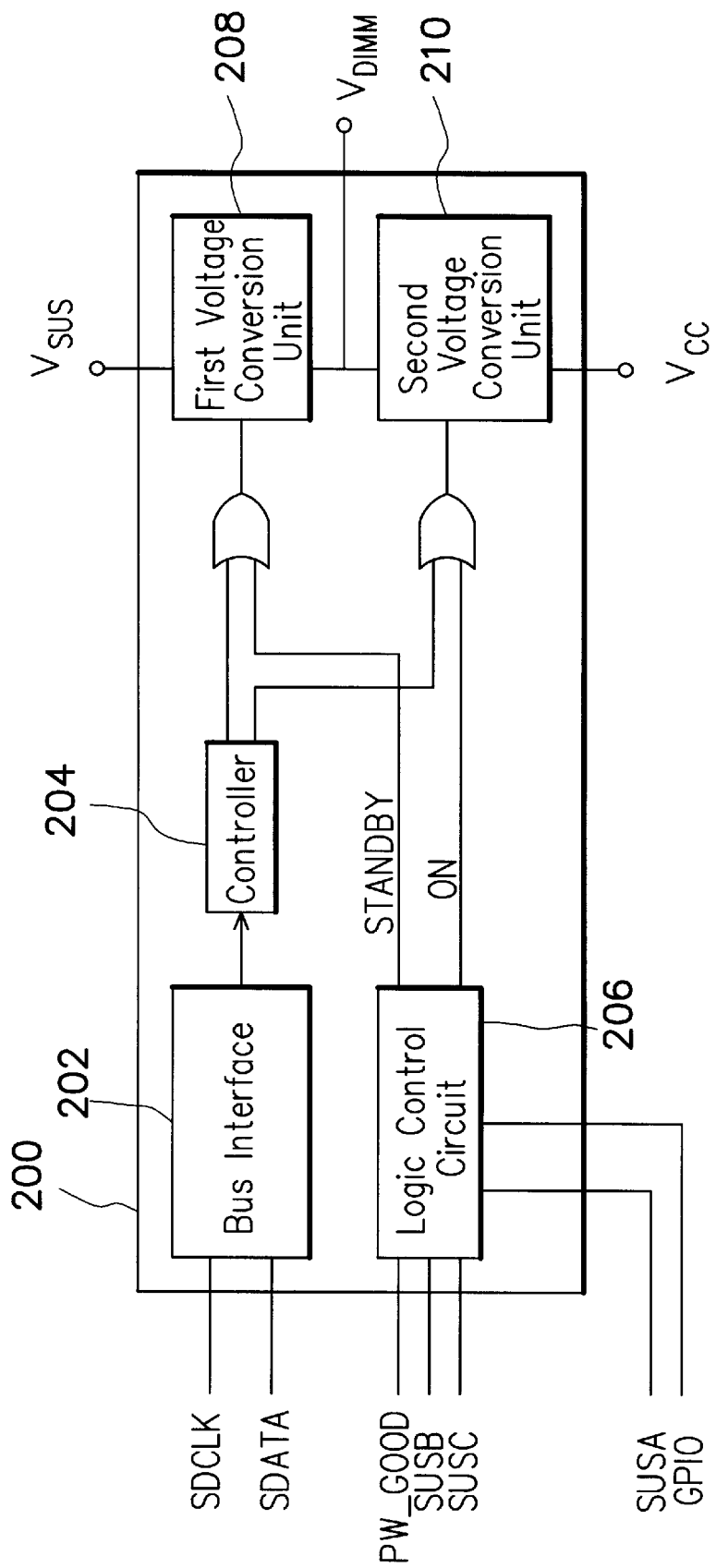
FIG. 4 is a schematic block diagram showing a voltage converter control chip for implementing a STR mode of power management according to this invention.

FIG. 4 is a schematic block diagram showing a voltage converter control chip for implementing a STR mode of power management according to this invention. The voltage converter control chip 200 can access data with a control chipset, such as a south bridge chipset, via a bus interface which comprises system management (SM) bus.

As shown in FIG. 4, the voltage converter control chip 200 comprises a bus interface 202, a controller 204, a logic control circuit 206, a first voltage-conversion unit 208 and a second voltage-conversion unit 210. The control chip 200 uses a signal line SDATA for data transmission and another signal line SDCLK for clock pulse transmission. The computer system is switched into the STR mode by changing the system memory voltage $V_{DIMM}$ from a normal working voltage (source voltage) $V_{CC}$ to a suspension voltage $V_{SUS}$. Changes in the system memory voltage $V_{DIMM}$ are achieved by varying the input signals PW_GOOD, SUSB, SUSC and SUSA. The voltage pin $V_{CC}$ of the control chip 200 is connected to a source voltage of typically about 3.3 V, and the suspension pin $V_{SUS}$ is connected to a suspension voltage.

To switch the computer system into the STR mode of power management, the power-good signal PW_GOOD is at logic '0', the suspend signal SUSB is at logic '1' and the suspend signal SUSC is at logic '0'. Hence, the output signal STANDBY coming from the logic control circuit 206 is at logic '1' while its complementary signal DN is at logic '0' so that the first converter 208 is opened while the second converter 210 is closed. Consequently, voltage at the system memory output pin $V_{DIM}$ becomes that of the suspension voltage $V_{SUS}$. In contrast, when the power good signal PW_GOOD and the signal SUSC are at logic '1' and the signal SUSB is at logic '0', both the output signal STANDBY and its complementary signal DN are at logic '1'. The first converter 208 is shut while the second converter 210 is opened so that voltage at the system memory pin $V_{DIMM}$ becomes that of the voltage source $V_{CC}$.

The logic control circuit 206 can be implemented using the flip-flop 106, the resume & initialization logic circuit 102 and the STR logic circuit 104 with connections as shown in FIG. 1. The first converter 208 and the second converter can be implemented using the circuits shown in FIGS. 2A and 2B, respectively.

In summary, the advantages and performance capabilities of the voltage converter of this invention include:

1. The computer system can switch into a STR mode or switch away from a STR mode of operation by changing the supplied voltage using simple MOSFET logic circuits.
2. Various components inside the voltage converter can be integrated together on a silicon chip and connected to a control chipset by a bus.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claim is:

1. A voltage converter for implementing a suspension-to-RAM (STR) mode of power management in a computer system, comprising:
   a flip-flop;
   a resume and initialization logic circuit for producing a resume signal, connected to a first input terminal of the flip-flop;
   a suspension-to-RAM (STR) logic circuit for producing a STR signal, an output terminal of the STR logic circuit being connected to a second input terminal of the flip-flop;
   a first voltage-conversion unit connected to an output terminal of the flip-flop so that when the resume signal is at a low level while the STR signal is at a high level, a suspension voltage is applied to a system memory of the computer; and
   a second voltage-conversion unit connected to a complementary output terminal of the flip-flop so that when the resume signal is at a high level while the STR signal is at a low level, a source voltage is applied to the system memory of the computer.

2. The voltage converter of claim 1, wherein the first voltage-conversion unit comprises a P-channel metal-oxide-semiconductor field effect transistor (PMOSFET) whose gate terminal is connected to the output terminal of the flip-flop, whose source terminal is connected to a suspension voltage and whose drain terminal is connected to a voltage pin of the system memory.

3. The voltage converter of claim 1, wherein the second voltage-conversion unit comprises an N-channel metal-oxide-semiconductor field effect transistor (NMOSFET) whose gate terminal is connected to the complementary output terminal of the flip-flop, whole source terminal is connected to a source voltage and whose drain terminal is connected to the voltage pin of the system memory.

4. The voltage converter of claim 3, wherein the converter further includes a transistor coupling between the complementary output terminal of the flip-flop and the second voltage-conversion unit for reversing the logic output from the complementary output terminal of the flip-flop.

5. The voltage converter of claim 4, wherein the transistor is a bipolar transistor whose base terminal is connected to the complementary output terminal of the flip-flop, whose collector terminal is connected to the second voltage-conversion unit and whose emitter terminal is grounded.

6. A voltage converter control chip for implementing a suspension-to-RAM mode of operation in a computer system, comprising:
   a bus interface connected to a control chip by a bus;
   a controller having a first and a second output terminal, wherein the controller is coupled to the bus interface for controlling the bus interface;
   a logic control circuit having a first and a second output terminal;
   a first voltage-conversion unit coupled to the logic control circuit and a first output terminal of the controller via a first logic gate, in which an input terminal of the first voltage-conversion unit is connected to a suspension voltage and an output terminal of the first voltage-conversion unit is connected to a voltage pin of a system memory; and
   a second voltage-conversion unit coupled to the logic control circuit and a second output terminal of the controller via a second logic gate, in which an input terminal of the second voltage-conversion unit is connected to a source voltage and an output terminal of the second voltage-conversion unit is connected to the voltage pin of the system memory;
   wherein to switch the computer system into the STR mode of operation, the first voltage-conversion unit is turned on while the second voltage-conversion unit is turned off under the control of the logic control circuit so that the suspension voltage is output to the system memory voltage pin and to revert the computer system back to a normal mode of operation, the first voltage-conversion unit is turned off while the second voltage-conversion unit is turned on, also under the control of the logic control circuit, so that the power voltage is output to the system memory voltage pin.

7. The voltage converter chip of claim 6, wherein the first voltage-conversion unit comprises a P-channel metal-oxide-semiconductor field effect transistor (PMOSFET) whose gate terminal is connected to the output terminal of the flip-flop, whose source terminal is connected to a suspension voltage and whose drain terminal is connected to a voltage pin of the system memory.

8. The voltage converter chip of claim 6, wherein the second voltage-conversion unit comprises an N-channel metal-oxide-semiconductor field effect transistor (NMOSFET) whose gate terminal is connected to the complementary output terminal of the flip-flop, whose source terminal is connected to a source voltage and whose drain terminal is connected to the voltage pin of the system memory.

9. The voltage converter chip of claim 6, wherein the bus interface includes a system management bus (SMB).

10. A voltage converter control chip for implementing a suspension-to-RAM mode of operation in a computer system, comprising:
   a bus interface connected to a control chip by a bus;
   a controller having a first and a second output terminal, wherein the controller is connected to the bus interface for controlling the bus interface;
   a logic control circuit having a first and a second output terminal, the logic circuit further comprising:
   a flip-flop;
   a resume and initialization logic circuit for producing a resume signal, in which an output terminal of the resume & initialization logic circuit is connected to a first input terminal of the flip-flop;
   a suspension-to-RAM (STR) logic circuit for producing a STR signal, in which an output terminal of the STR logic circuit is connected to a second input terminal of the flip-flop;
   a first voltage-conversion unit coupled to the logic control circuit and a first output terminal of the controller via a first logic gate, in which an input terminal of the first voltage-conversion unit is connected to a suspension voltage and an output terminal of the first voltage-conversion unit is connected to a voltage pin of a system memory; and
   a second voltage-conversion unit coupled to the logic control circuit and a second output terminal of the controller via a second logic gate, in which an input terminal of the second voltage-conversion unit is connected to a source voltage and an output terminal of the second voltage-conversion unit is connected to the voltage pin of the system memory;
   wherein to switch the computer system into the STR mode of power management, the first voltage-conversion unit is turned on while the second voltage-conversion unit is turned off under the control of the logic control circuit so that the voltage is output to the system memory voltage pin, and to revert the computer system back to a normal mode of power management, the first voltage-conversion unit is turned off while the second voltage-conversion unit is turned on, also under the control of the logic control circuit, so that the power voltage is output to the system memory voltage pin.

11. The voltage converter chip of claim 10, wherein the first voltage-conversion unit comprises a P-channel metal-oxide-semiconductor field effect transistor (PMOSFET) whose gate terminal is connected to the output terminal of the flip-flop, whose source terminal is connected to a suspension voltage and whose drain terminal is connected to a voltage pin of the system memory.

12. The voltage converter chip of claim 10, wherein the second voltage-conversion unit comprises an N-channel metal-oxide-semiconductor field effect transistor (NMOSFET) whose gate terminal is connected to the complementary output terminal of the flip-flop, whose source terminal is connected to a source voltage and whose drain terminal is connected to the voltage pin of the system memory.

13. The voltage converter chip of claim 10, wherein the converter chip further includes a transistor connected to the complementary output terminal of the flip flop and the second voltage-conversion unit for reversing the logic output signal from the complementary output terminal of the flip-flop.

14. The voltage converter chip of claim 10, wherein the bus interface includes a system management bus (SMB).

* * * * *